United States Patent [19]

Schroeder

[11] Patent Number: 5,167,091
[45] Date of Patent: Dec. 1, 1992

[54] CLIP AND METHOD FOR SUPPORTING PLANTS ON WOODEN FENCES

[76] Inventor: Joel M. Schroeder, 4314 Shady Springs, Seabrook, Tex. 77586

[21] Appl. No.: 616,612

[22] Filed: Nov. 21, 1990

[51] Int. Cl.[5] ............................................. A01G 17/06
[52] U.S. Cl. ................................... 47/44; 411/506; 411/913; 248/231.5
[58] Field of Search ................ 47/44; 411/505, 913, 411/471, 472, 456

[56] References Cited

U.S. PATENT DOCUMENTS

| | | | |
|---|---|---|---|
| 1,790,348 | 1/1931 | Jewell | 411/471 |
| 4,145,840 | 3/1979 | Davidson | 47/44 |
| 5,036,567 | 8/1991 | Clinch | 411/508 |

FOREIGN PATENT DOCUMENTS 5844 of 1903 United Kingdom ................ 47/44

*Primary Examiner*—Henry E. Raduazo
*Attorney, Agent, or Firm*—Dodge, Bush, Moseley & Riddle

[57] ABSTRACT

A clip (20) for supporting a vine or plant stem (S) on a pair of planks (12, 14) of a wooden fence (10). The clip (20) has an elongate body portion (22) and a pair of legs (24, 26) extending in opposite transverse directions relative to the longitudinal axis L of the elongate body portion (22). The clip (20) is mounted within the space (T) between opposed side edges (16, 18) of the wooden planks (12, 14) with the legs (24, 26) having projecting gripping elements (30) for biting into and gripping the wooden side edges (16, 18) upon insertion of the legs (24, 26) within the space (T) between the side edges (16, 18). Upon installation of the clip (20) with the plant stem (S) received between the legs (24, 26) and inward depression of the legs (24, 26) for fitting between the side edges (16, 18) a torsional loading of the elongate body portion (22) occurs. Upon release of the legs (16, 18) gripping elements (30) of the legs (24, 26) are urged into gripping contact with the wooden planks (12, 14) from the torisonal loading of body portion (22) with the plant stem (S) extending across the space (T) formed between the planks (12, 14).

7 Claims, 1 Drawing Sheet

CLIP AND METHOD FOR SUPPORTING PLANTS ON WOODEN FENCES

BACKGROUND OF THE INVENTION

This invention relates to a clip and method for supporting plants on wooden fences, and more particularly to such a clip and method utilizing the space between a pair of adjacent boards or planks on the fence for supporting the plants.

Heretofore, various types of clamps or clips have been utilized for supporting vines and stems of plants on a wooden fence. Normally the clips, such as staples or the like, have been driven or nailed into the wooden fence with the plant stem received or supported between the clip and the fence. Oftentimes, it is difficult or cumbersome to drive or nail a clip in a wooden fence as the fence may not be easily accessible or covered with other plants.

Separate stakes or trellis-type supports have also been utilized for supporting plants but the installation of such separate supports have often been time consuming and/or expensive.

SUMMARY OF THE INVENTION

This invention is particularly directed to a flexible clip which may be manually secured in the space between a pair of planks or boards in a fence without the use of any adhesives or tools, such as a hammer or pliers required for securing the clip. The clip is easily installed about the stem of a plant and a flexible leg of the clip is inserted within the space between two planks with the other leg then depressed inwardly and inserted within the space. Upon manual release of the opposed flexible legs, the legs expand outwardly against the opposed side edges of the planks and gripping elements on the legs, such as barbs, engage the opposed side edges of the planks to anchor the clip between the planks. Normally, planks such as wooden boards, are spaced around ⅛ inch to ⅜ inch form each other and this space is adequate to receive the clip of the present invention.

It is an object of this invention to provide a flexible clip for insertion in the space between a pair of adjacent planks on a fence to support a vine or plant stem.

It is another object of this invention to provide a method of installing a flexible clip manually in the space between a pair of adjacent planks in a fence for supporting a plant stem without the utilization of any tools or adhesives being required.

It is a further object of this invention to provide such a flexible clip which may be manually gripped to depress opposed flexible legs for insertion between a pair of planks, and then released for securement of the clip between opposed side edges of the planks.

Other objects, advantages, and features of this invention will become more apparent after referring to the following specification and drawings.

DESCRIPTION OF THE INVENTION

Figure 1:
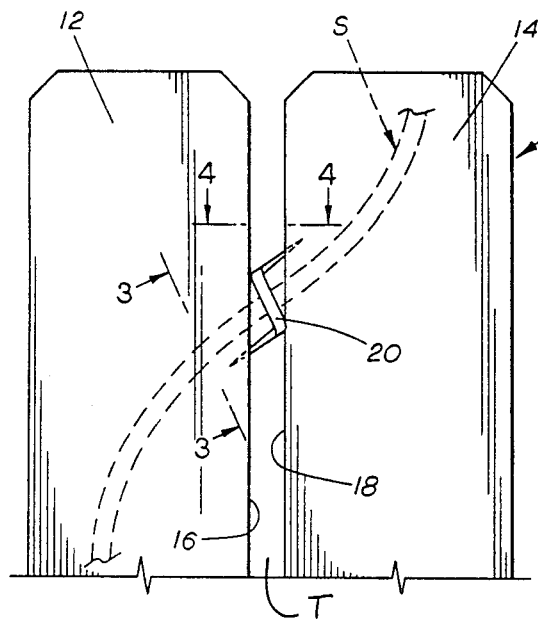
FIG. 1 is a side elevation of a portion of a wooden fence showing the flexible clip of the present invention secured to opposed side edges of a pair of planks in the fence.
Figure 2:
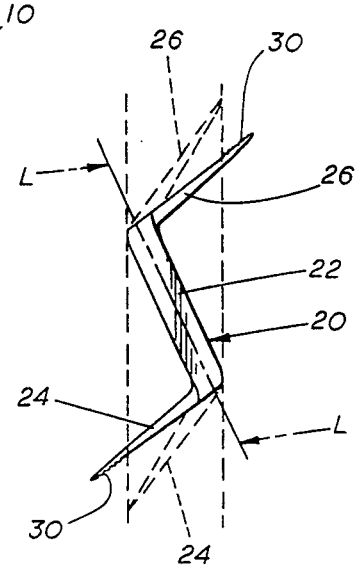
FIG. 2 is an enlarged fragment of FIG. 1 showing the clip of the present invention with the planks shown in broken lines.
Figure 3:
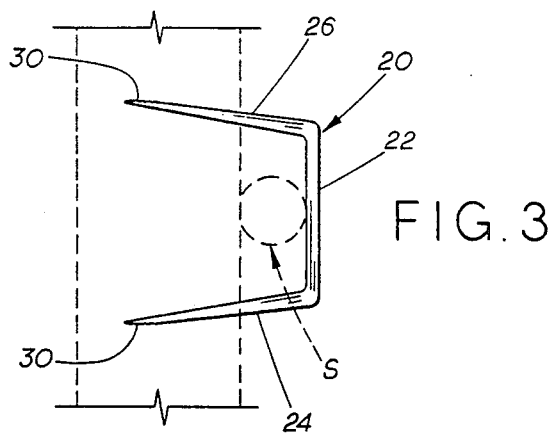
FIG. 3 is a section taken generally along line 3—3 of FIG. 1.
Figure 5:
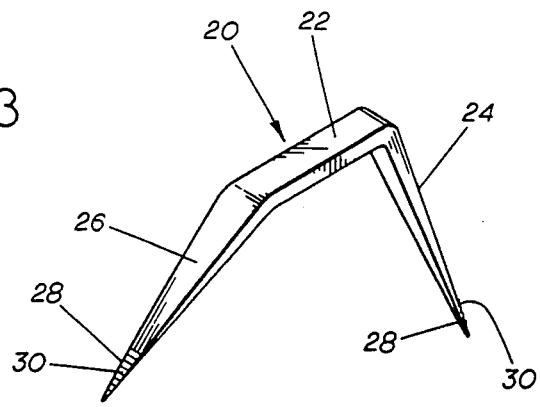
FIG. 5 is a perspective of the clip removed from the fence.
Figure 4:
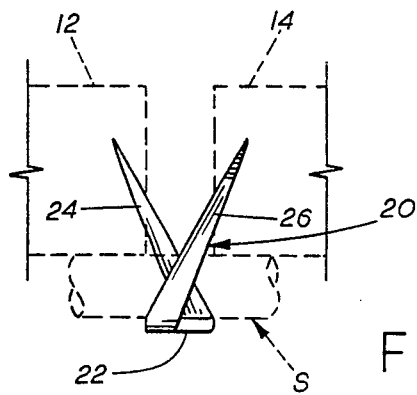
FIG. 4 is a section taken generally along line 4—4 of FIG. 1.

Referring now to the drawings, a wooden fence is shown generally at 10 and includes a pair of vertically extending planks 12 and 14 having opposed side edges 16 and 18 spaced from each other at T a distance of around ¼ inch. Planks 12 and 14 have a thickness of ⅜ inch and the width of opposed side edges 16 and 18 is likewise ⅜ inch.

A flexible clip comprising the present invention is shown generally at 20 and includes a central body portion or web 22 and depending integral legs 24 and 26. Body portion 22 is of a generally rectangular configuration and is adapted for torsional loading from legs 24 and 26 upon installation of clip 20 on fence 10. Legs 24 and 26 are positioned in an offset relation to each other with leg 24 extending laterally of the longitudinal axis L of body portion 22 in one outward direction and leg 26 extending laterally of the longitudinal axis L of body portion 22 in an opposite outward direction. Upon movement of legs 24 and 26 toward an opposed opposite position a torsional loading is applied to body portion 20 for continuously urging legs 24, 26 away from each other in a transverse or lateral direction relative to longitudinal axis L of body portion 22. Each leg 24, 26 is of a generally triangular configuration and has an extending end portion 28 with a plurality of barbs or serrations 30 on the outer surface of end portion 28 for biting or digging into wooden planks 12, 14 to form gripping or securing means for clip 20. Each end portion 28 has a sharp end which is normally pushed manually into an adjacent side edge 16, 18 for securement. Clip 20 must be of dimensions so that legs 24 and 26 may fit in the space between adjacent boards 12 and 14. Thus, a thickness of legs 12 and 14 of around 1/32 inch has been found to be satisfactory. Normally, a spacing of around ⅛ inch to ⅜ inch is provided between adjacent boards.

For installation, clip 20 first receives a vine or plant stems between legs 24 and 26. Then one of the legs 24 or 26 is inserted manually in the space between adjacent boards 12 and 14 with the sharp end of end portion 28 and barbs 30 engaging a side of one of the boards. Next, the other leg is depressed inwardly manually to exert a torsional load against main body 22 and then the other leg is inserted within the space between boards 12 and 14 with the sharp end of end portion 28 and barbs 30 digging into the adjacent side edge of the other board. Upon manual release of the legs, both legs 24 and 26 expand outwardly in opposite directions under urging from the torsional loading of body portion 22 along with the bending loading of body portion 22 resulting from the movements of legs 24 and 26 relative to body portion 22 thereby to exert a continuous urging of barbs 30 into gripping engagement with the adjacent side edges 16 and 18. In the installed position, the longitudinal axis L of body portion 22 extends in a generally vertical direction for securement of plant stem S against the front surface of planks 12 and 14. Thus, plant stem S is not positioned in the space or crack between boards 12 and 14 but extends across the space as shown in FIG. 1.

While clip 20 and its method of installation have been described for utilization for supporting vines or plants on wooden planks in a fence, it is to be understood that the present invention may be utilized to support plants or other objects on other structures, such as, for example, stone or brick walls, plastic trellises, or the like.

While a preferred embodiment of the present invention has been illustrated in detail, it is apparent that modifications and adaptations of the preferred embodiment will occur to those skilled in the art. However, it is to be expressly understood that such modifications and adaptations are within the spirit and scope of the present invention as set forth in the following claims.

What is claimed is:

1. A clip for fitting over and supporting a plant stem on the outer surface of a pair of spaced adjacent wooden planks of a fence and adapted for mounting in the space between said pair of adjacent planks for securement against opposed side edges of the planks; said clip comprising:

an elongate intermediate body portion having a longitudinal axis and an integral resilient leg extending from each end of said body portion, said legs being movable relative to said body portion between a free unbiased non-installed position and a biased installed position between said pair of planks;

said legs in said unbiased non-installed position of said clip extending in opposite transverse directions relative to the longitudinal axis of said elongate body portion and being of a thickness less than the spacing between said pair of adjacent planks; said legs when urged toward each other in a transverse direction relative to the longitudinal axis of said body portion exerting a torsional loading on said main body portion for a continuously urging said legs away from each other;

said legs upon mounting of said clip being urged manually toward each other in a transverse direction relative to the longitudinal axis of said elongate body portion for fitting in the space between said planks and upon manual release contacting the side edges of said planks for gripping and securement of said clip.

2. A clip as set forth in claim 1 wherein each of said legs has a plurality of barb-like gripping elements extending outwardly from each leg adjacent the extending end thereof for biting into the side edges of said planks.

3. A clip as set forth in claim 1 wherein each of said legs is of a generally triangular shape and said main body portion is of a generally rectangular shape.

4. A clip as set forth in claim 1 wherein said legs in an unbiased non-installed position of said clip extend outwardly of said body portion in a direction parallel to the longitudinal axis of said body portion; said legs upon mounting of said clip being urged manually toward each other in a direction generally parallel to the longitudinal axis of the body portion to provide a bending at the juncture of said legs with said body portion and upon manual release said legs contact the side edges of said planks for gripping and securement of said clip.

5. A clip fitting over and for supporting an elongate object on a mounting surface formed by spaced planks of a fence and adapted for manual securement in the space between opposed side edges of a pair of adjacent spaced planks without the utilization of any separate tool; said clip comprising:

an elongate intermediate body portion having a longitudinal axis and an integral resilient leg extending from each end of said body portion, said legs being movable relative to said body portion between a free unbiased non-installed position and a biased installed position between said pair of planks;

said legs in said unbiased non-installed position of said clip extending in opposite transverse directions relative to the longitudinal axis of said elongate body portion and being of a thickness less than the spacing between said pair of adjacent planks, said legs when urged toward each other in a direction transverse to the longitudinal axis of said body portion exerting a torsional loading on said main body portion for continuously urging said legs away from each other;

said legs upon mounting of said clip being urged manually toward each other in a transverse direction relative to the longitudinal axis of said elongate portion for fitting in the space between said planks and upon manual release contacting the side edges of said planks for gripping and securement of said clip.

6. A clip as set forth in claim 5 wherein each of said legs has a plurality of barb-like gripping elements extending outwardly from each leg adjacent the extending end thereof for biting into the side edges of said planks.

7. A clip as set forth in claim 5 wherein each of said legs is of a generally triangular shape and said main body portion is of a generally rectangular shape.

* * * * *